United States Patent [19]

Swihart et al.

[11] Patent Number: 4,528,313
[45] Date of Patent: Jul. 9, 1985

[54] POLYDIMETHYLSILOXANES HAVING IMPROVED THERMAL STABILITY

[75] Inventors: Terence J. Swihart, Essexville, Mich.; James E. Jones, Elkhart, Ind.

[73] Assignee: Dow Corning Corporation, Midland, Mich.

[21] Appl. No.: 620,972

[22] Filed: Jun. 15, 1984

[51] Int. Cl.$^3$ ................................................ C08K 5/04
[52] U.S. Cl. ................................ 524/397; 252/400 R; 252/407; 524/398; 556/15
[58] Field of Search ....................... 260/439 R, 429.2; 252/400 R, 407; 524/397, 398

[56] References Cited

U.S. PATENT DOCUMENTS

| 2,445,567 | 7/1948 | Elliott | 260/448.2 |
| 2,465,296 | 3/1949 | Swiss | 174/121 |
| 4,070,343 | 1/1978 | Kishimoto et al. | 260/45.75 |

Primary Examiner—Melvyn I. Marquis
Attorney, Agent, or Firm—Andrew H. Ward

[57] ABSTRACT

Silicone compositions having improved thermal oxidative stability are disclosed. The compositions contain iron acetylacetonate, nickel acetylacetonate, cerium acetylacetonate, alpha,omega-bis(trimethylsiloxy)-polydimethylsiloxanes, and optionally, a carboxylic acid. The compositions show greatly increased gel times at temperatures of, e.g. 275° C.

12 Claims, No Drawings

POLYDIMETHYLSILOXANES HAVING IMPROVED THERMAL STABILITY

BACKGROUND OF THE INVENTION

The present invention relates to improvements in the heat resistance of silicones. More specifically, it relates to improvements in the thermal oxidative stability of alpha,omega-bis(trimethylsiloxy)polydimethylsiloxane.

While silicones in general are known for their thermal oxidative stability, it is advantageous to make them more resistant. For example, it might be desired to use a silicone fluid at a temperature of 275° C., in air. In the absence of additives or special precautions, the silicone fluid will gel in a few hours, e.g. 1 to 6 hours. By gel, it is meant to become a non-pourable solid or semisolid.

Many substances have been used as additives to improve the thermal oxidative stability of silicone fluids. For example, the patent literature discloses the following additives: amines, ethers, catechols, borates, alkali metal salts of fluorinated acetic acid, substituted phenols, lignin, phosphites, pyrogallols, ferrocene, ammonium halides, triazines, nitriles, thioaniline derivatives, and a large number of other additives.

U.S. Pat. No. 2,465,296, issued Mar. 22, 1949 to J. Swiss, discloses, as additives to polymeric silicon compounds, chelates of metals from every group in the Periodic Table. The best gel times found by Swiss were 2160 hours, at 250° C., with 0.2% by weight additive.

U.S. Pat. No. 2,445,567, issued July 20, 1948 to J. Elliott, discloses iron, cobalt, nickel, or copper carboxylates which are added to liquid organosubstituted polysiloxanes. Addition of such a carboxylate at the 0.1% level resulted in a 300° gel time of 380 hours.

U.S. Pat. No. 4,070,343, issued Jan. 24, 1978, to Kishimoto et al., discloses the use of the reaction products of cerium salts with alkali metal siloxanolates, in conjunction with a zirconium, titanium, or iron carboxylic acid salt or alkoxy compound. The two salts are used in organosiloxane polymers.

None of the above references discloses the use of three salts in conjunction. The use of three particular salts in conjunction has been found to be a substantially more effective thermal oxidative stability additive for alpha,omega-bis(trimethylsiloxy)polydimethylsiloxanes than equivalent amounts of either one salt alone or two salts in conjunction.

SUMMARY OF THE INVENTION

It is an object of the present invention to provide silicone compositions resistant to gelation at elevated temperatures in the presence of oxygen. It is a further object to provide additives for alpha,omega-bis(trimethylsiloxy)polydimethylsiloxanes that greatly enhance their thermal oxidative stability. It is yet a further object to provide a method for improving the thermal oxidative stability of alpha,omega-bis(trimethylsiloxy)-polydimethylsiloxanes.

These objects and others are attained by the present invention.

In one aspect, the present invention relates to a composition comprising:
(A) iron acetylacetonate;
(B) nickel acetylacetonate;
(C) cerium acetylacetonate; and
(E) alpha,omega-bis(trimethylsiloxy)polydimethylsiloxane.

The compositions optionally contain (D), a carboxylic acid having from 2 to 12 carbon atoms.

In a second aspect, the present invention relates to a mixture of salts (A), (B), and (C) with carboxylic acid (D).

In a third aspect, the present invention relates to a method for improving the thermal oxidative stability of an alpha,omega-bis(trimethylsiloxy)polydimethylsiloxane by dispersing the mixture of (A), (B), (C) and (D) into the alpha,omega-bis(trimethylsiloxy)polydimethylsiloxane.

DETAILED DESCRIPTION OF THE INVENTION

The present invention relates to a silicone composition having improved heat stability, said composition comprising (A) from 0.004 to 0.10 percent by weight of iron acetylacetonate;
(B) from 0.004 to 0.10 percent by weight of nickel acetylacetonate;
(C) from 0.004 to 0.10 percent by weight of cerium acetylacetonate;
(D) from 0 to 30 percent by weight of a carboxylic acid having from 2 to 9 carbon atoms; and
(E) from 69.7 to 99.988 percent by weight of alpha,omega-bis(trimethylsiloxy)polydimethylsiloxane fluid, all of the above percents being based on the total weight of the composition.

In another aspect, the present invention relates to a mixture of salts for stabilizing alpha,omega-bis(trimethylsiloxy)polydimethylsiloxane fluids, said mixture comprising (A) 0.5 to 10 percent by weight iron acetylacetonate;
(B) 0.5 to 10 percent by weight nickel acetylacetonate;
(C) 0.5 to 10 percent by weight cerium acetylacetonate;
(D) 70 to 98.5 percent of a carboxylic acid having from 2 to 9 carbon atoms, all of the above percents being based on the total weight of the mixture.

In another aspect, the present invention relates to a method for improving the heat stability of an alpha,omega-bis(trimethylsiloxy)polydimethylsiloxane, said method comprising dispersing within the alpha,omega-bis(trimethylsiloxy)polydimethylsiloxane a mixture of salts, said mixture comprising (A) 0.5 to 10 percent by weight iron acetylacetonate;
(B) 0.5 to 10 percent by weight nickel acetylacetonate;
(C) 0.5 to 10 percent by weight cerium acetylacetonate;
(D) 70 to 98.5 percent of a carboxylic acid having from 2 to 9 carbon atoms, all of the above percents being based on the total weight of the mixture.

The three salts used in the compositions and method of the present invention are:

$Fe^{3+}$(acetylacetonate)$_3^{-1}$, $Ni^{2+}$(acetylacetonate)$_2^{-1}$, and $Ce^{3+}$(acetylacetonate)$_3^{-1}$ wherein (acetylacetonate)$^{-1}$ represents the structure

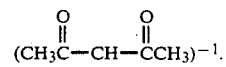

Tautomeric structures such as

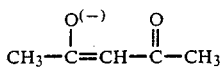

and the like are also used by those skilled in the art to represent the acetylacetonate structure.

Iron, nickel, and cerium acetylacetonates are stable salts. They are commercially available from numerous sources. Often they are available as hydrates, i.e. complexes having water associated with them.

The use of hydrates rather than non-hydrated salts has no deleterious effect on the compositions and method of the present invention. Parts and percentages, however, are to be calculated on the basis of non-hydrated salts.

The carboxylic acid, component (D) of the present invention, has from 2 to 9 carbon atoms. Thus the carboxylic acid can be acetic acid, propanoic acid, butanoic acid, pentanoic acid, hexanoic acid, heptanoic acid, octanoic acid, pelargonic acid, and acids which are isomers of the above acids.

Particularly preferred is 2-ethylhexanoic acid, which is an isomer of octanoic acid.

Carboxylic acids as described above are well known and readily available commercially.

A single acid, i.e. a relatively pure chemical species, can be used, or a mixture of two or more acids can be used.

While freedom of the acid from impurity is not known to be critical, reasonable care should be taken to exclude large quantities of contaminants. For example, carboxylic acids which are badly discolored or carboxylic acids which are known to contain contaminants should be avoided.

The alpha,omega-bis(trimethylsiloxy)polydimethylsiloxanes of the compositions of the present invention are also well known and widely available. They have the general formula $Me_3SiO(Me_2SiO)_xSiMe_3$, wherein, in said general formula, Me represents the methyl radical and x has a value of from 0 to 5000 or more. The alpha,omega-bis(trimethylsiloxy)polydimethylsiloxanes can thus have a viscosity of from 0.65 centistokes at 25° C. to 20,000,000 and more centistokes at 25° C. The term alpha,omega-bis(trimethylsiloxy)polydimethylsiloxanes is to be taken as encompassing the species $Me_3SiOSiMe_3$ even though it is not literally a polydimethylsiloxane.

The compositions of the present invention are made by dispersing components (A), (B), and (C) in the alpha,omega-bis(trimethylsiloxy)polydimethylsiloxane, component (E).

By the term dispersing it is meant herein mixing such that the components become visibly homogeneous, i.e. no distinct phases can be seen by the unaided eye.

While dispersing can be accomplished in some cases by high shear mechanical mixing, it is convenient and preferable to accomplish dispersion of Components (A), (B) and (C) by first dispersing said components in the carboxylic acid, Component (D). This mixture of salts dispersed in Component (D) can then be dispersed in the alpha,omega-bis(trimethylsiloxy)polydimethylsiloxane Component (E). The mixture of salts comprises from 0.5 to 10% by weight of each of Components (A), (B) and (C), and from 70% to 98.5 percent by weight of the carboxylic acid, Component (D), the above percents being based on the total weight of (A) plus (B) plus (C) plus (D).

If a silicone composition substantially free of carboxylic acid is desired, two methods of obtaining such a composition are thought at this time to be operative.

In a first method, relatively small amounts of Components (A), (B) and (C) can be dispersed in the alpha,omega-bis(trimethylsiloxy)polydimethylsiloxane Component (E) by means of high shear mixing.

In a second method, a mixture of the salts (A), (B), and (C) is made in a carboxylic acid of comparatively high volatility, such as acetic or propanoic acid. This mixture is then dispersed in an alpha,omega-bis(trimethylsiloxy)polydimethylsiloxane of comparatively low volatility. The carboxylic acid can then be removed from the resulting product by stripping. Stripping is accomplished by applying heat and/or reducing the pressure, thus selectively volatilizing the acid. Vapors of the acid can be collected in a separate vessel.

Dispersing and mixing, as referred to herein, are readily accomplished by simply mechanical means. For example, appropriate stirrers, mixers, mills, homogenizers and the like can be used.

The silicone compositions of the present invention comprise 0.004 to 0.10 percent Component (A), 0.004 to 0.10 percent Component (B), 0.004 to 0.10 percent Component (C), 0 to 30 percent Component (D), and from 69.7 to 99.988 percent Component (E), all of the above percents being percents by weight, based on the total composition.

More preferably, Component (A) is present from 0.01 to 0.05 percent by weight, Component (B) is present from 0.01 to 0.05 percent by weight, Component (C) is present from 0.01 to 0.05 percent by weight, Component (D) is present from 3 to 15 percent by weight, and Component (E) is present from 84.97 to 96.85 percent by weight, based on the total weight of the composition.

Most preferably, Component (A) is present from 0.020 to 0.030 percent by weight, Component (B) is present from 0.014 to 0.021 percent by weight, Component (C) is present from 0.024 to 0.036 percent by weight, Component (D) is present from 5.8 to 8.7 percent by weight, and Component (E) is present from 91.213 to 94.142 percent by weight, based on the total weight of the composition.

The most preferred amounts of Components (A), (B), and (C) represent approximately equimolar amounts of the metals. It is highly preferred to use approximately equimolar amounts. Equimolar amounts are in the ratio (A):(B):(C)=1.0:0.7:1.2.

The mixture of salts for stabilizing alpha,omega-bis(trimethylsiloxy)polydimethylsiloxanes comprises 0.5 to 10 percent by weight Component (A); 0.5 to 10 percent by weight Component (B): 0.5 to 10 percent by weight Component (C), and 70 to 98.5 percent by weight of the carboxylic acid, component (D), the above based on the total weight of the mixture of salts, i.e. (A), (B), (C), and (D).

More preferably,
Component (A) is present from 1 to 6% percent by weight;
Component (B) is present from 1 to 6% percent by weight;
Component (C) is present from 1 to 6% percent by weight; and
Component (D) is present from 82 to 97 percent by weight.

Most preferably,
Component (A) is present from 2 to 3 percent by weight;

Component (B) is present from 1.4 to 2.1 percent by weight;

Component (C) is present from 2.4 to 3.6 percent by weight; and

Component (D) is present from 91.3 to 94.2 percent by weight.

It is highly preferred that the three salts be present in the mixture in equimolar quantities, i.e. in the ratio (A):(B):(C) as 1.0:0.7:1.2.

The mixture of three salts, as described herein, has been found up to 2000 times as effective in improving the thermal oxidative stability of alpha,omega-bis(trimethylsiloxy)polydimethylsiloxanes than equivalent amounts of mixtures of two salts, or one salt by itself. This result was unexpected and was unpredictable.

The silicone compositions of the present invention are useful in heat transfer, as fiber lubricants, as high temperature lubricants, and other uses. Additionally, the silicone compositions of the present invention can be advantageously mixed with other ingredients, thereby forming curable elastomers, curable resin compositions, greases, and other formulated products.

The following Examples are included to further teach how to make the compositions of the present invention, and how to practice the method of the present invention. Parts and percentages reported herein are by weight unless otherwise specified.

EXAMPLES 1-3

A mixture of salts consisting of 0.1 g iron acetylacetonate, 0.1 g nickel acetylacetonate, 0.1 g cerium acetylacetonate, and 14.11 g of 2-ethylhexanoic acid was made by simple mechanical mixing. The resulting compositions of the present invention had the following amounts of ingredients:

0.69 percent iron acetylacetonate
b 0.69 percent nickel acetylacetonate
0.69 percent cerium acetylacetonate, and
97.92 percent 2-ethylhexanoic acid.

The above mixure of salts was dispersed, by simple mechanical mixing, in an alpha,omega-bis(trimethylsiloxy)polydimethylsiloxane having a viscosity of 50 centistokes at 25° C. The mixture of salts was added at 1%, 3%, and 5% additive levels. Each of the resulting silicone compositions of the present invention was placed in an aluminum dish. The four dishes were placed in an air-circulating oven set at 250° C. and were inspected periodically. After about 7.5 hours, the alpha,omega-bis(trimethylsiloxy)polydimethylsiloxane with no additive had gelled. After 1536 hours, the sample with 1% of the mixture of salts had gelled. Testing was terminated before gelation occurred with the two remaining Examples.

EXAMPLES 4-6

A mixture of salts was made consisting of 0.625 g iron acetylacetonate, 0.625 g nickel acetylacetonate, 1.25 g cerium acetylacetonate, and 20 g of 2-ethylhexanoic acid. This resulted in the following amounts of ingredients:

2.8% iron acetylacetonate
2.8% nickel acetylacetonate
5.6% cerium acetylacetonate
88.9% 2-ethylhexanoic acid Dispersions of 1% of the above mixture in each of three different alpha,omega-bis(trimethylsiloxy)polydimethylsiloxanes were made. The three alpha,omega-bis(trimethylsiloxy)polydimethylsiloxanes had viscosities of 60,000 centistokes, 300,000 centistokes, and 2,500,000 centistokes (respectively) at 25° C.

Two gram samples of each of the siloxanes were exposed in an air circulating oven set at 260° C. and observed, along with control siloxanes containing no additive.

60,000 centistoke siloxane with no additive: gelled in 11 hours;
60,000 centistoke siloxane with 1% salt mixture: test discontinued after 906 hours (Example 4).
300,000 centistoke siloxane with no additive: gelled in 5 hours;
300,000 centistoke siloxane with 1% salt mixture: signs of gel at 690 hours (Example 5).
2,500,000 centistoke siloxane with no additive: gelled in 8 hours;
2,500,000 centistoke siloxane with 1% salt mixture: gelled in about 109 hours (Example 6).

EXAMPLE 7

A silicone composition consisting of the salt and carboxylic acid mixture of Example 1 and alpha,omega-bis(trimethylsiloxy)polydimethylsilloxane having a viscosity of 350 centistokes at 25° C. was made. The amount of constituents and 275° C. gel time are found in Table 1.

Comparison compositions were also made, consisting of one or two of the three salts, 2-ethylhexanoic acid, and 350 centistoke alpha,omega-bis(trimethylsiloxy)polydimethylsiloxane. The results of gel time testing are found in Table 1.

TABLE 1

Gel Time vs. Added Salts

| Example | % iron acetylacetonate | % nickel acetylacetonate | % cerium acetylacetonate | % 2-ethylhexanoic acid | 275° C. gel time (hours) |
|---|---|---|---|---|---|
| 7 | 0.0066 | 0.0046 | 0.0079 | 1.98 | >5112 |
| Comparison A | .02 | — | — | 1.98 | 624 |
| Comparison B | .01 | 0.017 | — | 1.98 | 1104 |
| Comparison C | — | 0.014 | — | 1.985 | 4 |
| Comparison D | — | 0.007 | 0.012 | 1.98 | 816 |
| Comparison E | — | — | 0.024 | 1.975 | 984 |
| Comparison F | .01 | — | 0.012 | 1.98 | 4700 |
| Comparison G | — | — | — | 2.0 | 4 |

The procedures and amounts set forth in Example 5 were repeated for an hydroxyfunctional polydimethylsiloxane having a viscosity of about 170 centistokes at 25° C., and for a polydimethylsiloxane—polyglycol copolymer having a viscosity of about 35 centistokes at 25° C. In both cases, the fluid with the added mixture of salts gelled, at 275° C., before the same fluid with no additive.

That which is claimed is:

1. A silicone composition having improved heat stability, said composition comprising:
   (A) from 0.004 to 0.10 percent by weight of iron acetylacetonate;
   (B) from 0.004 to 0.10 percent by weight of nickel acetylacetonate;
   (C) from 0.004 to 0.10 percent by weight of cerium acetylacetonate;
   (D) from 0 to 30 percent by weight of a carboxylic acid having from 2 to 9 carbon atoms; and
   (E) from 69.7 to 99.988 percent by weight of alpha,omega-bis(trimethylsiloxy)polydimethylsiloxane fluid, all of the above percents being based on the total weight of the composition.

2. A composition as claimed in claim 1 wherein
   Component (A) is present from 0.01 to 0.05 percent by weight;
   Component (B) is present from 0.01 to 0.05 percent by weight;
   Component (C) is present from 0.01 to 0.05 percent by weight;
   Component (D) is present from 3 to 15 percent by weight; and
   Component (E) is present from 84.97 to 96.85 percent by weight.

3. A composition as claimed in claim 2 wherein
   Component (A) is present from 0.020 to 0.030 percent by weight;
   Component (B) is present from 0.014 to 0.021 percent by weight;
   Component (C) is present from 0.024 to 0.036 percent by weight;
   Component (D) is present from 5.8 to 8.7 percent by weight; and
   Component (E) is present from 91.213 to 94.142 percent by weight.

4. A composition as claimed in claim 3 wherein
   Component (D) is 2-ethylhexanoic acid.

5. A mixture of salts comprising
   (A) 0.5 to 10 percent by weight iron acetylacetonate;
   (B) 0.5 to 10 percent by weight nickel acetylacetonate;
   (C) 0.5 to 10 percent by weigh cerium acetylacetonate; and
   (D) 70 to 98.5 percent by weight of a carboxylic acid having from 2 to 9 carbon atoms, all of the above percents being based on the total weight of the mixture.

6. A mixture of salts as claimed in claim 5 wherein
   Component (A) is present from 1 to 6.0 percent by weight;
   Component (B) is present from 1 to 6.0 percent by weight;
   Component (C) is present from 1 to 6.0 percent by weight; and
   Component (D) is present from 82 to 97 percent by weight.

7. A mixture of salts as claimed in claim 6 wherein
   Component (A) is present from 2 to 3 percent by weight;
   Component (B) is present from 1.4 to 2.1 percent by weight;
   Component (C) is present from 2.4 to 3.6 percent by weight; and
   Component (D) is present from 91.3 to 94.2 percent by weight.

8. A mixture of salts as claimed in claim 7 wherein
   Component (D) is 2-ethylhexanoic acid.

9. Method for improving the heat stability of an alpha,omega-bis(trimethylsiloxy)polydimethylsiloxane, said method comprising dispersing within the alpha,omega-bis(trimethylsiloxy)polydimethylsiloxane a mixture of salts, said mixture comprising:
   (A) 0.5 to 10 percent by weight iron acetylacetonate;
   (B) 0.5 to 10 percent by weight nickel acetylacetonate;
   (C) 0.5 to 10 percent by weight cerium acetylacetonate;
   (D) 70 to 98.5 percent of a carboxylic acid having from 2 to 9 carbon atoms, all of the above percents being based on the total weight of the mixture.

10. A method as claimed in claim 9 wherein
    Component (A) is present from 1 to 6.0 percent by weight
    Component (B) is present from 1 to 6.0 percent by weight
    Component (C) is present from 1 to 6.0 percent by weight; and
    Component (D) is present from 82 to 97 percent by weight.

11. A method as claimed in claim 10 wherein
    Component (A) is present from 2 to 3 percent by weight;
    Component (B) is present from 1.4 to 2.1 percent by weight;
    Component (C) is present from 2.4 to 3.6 percent by weight; and
    Component (D) is present from 91.3 to 94.2 percent by weight.

12. A method as claimed in claim 11 wherein
    Component (D) is 2-ethylhexanoic acid.

* * * * *